United States Patent
Russ et al.

(10) Patent No.: US 6,269,793 B1
(45) Date of Patent: Aug. 7, 2001

(54) INTERNAL COMBUSTION ENGINE HAVING DECELERATION FUEL SHUT OFF AND CAMSHAFT CONTROLLED CHARGE TRAPPING

(75) Inventors: Stephen George Russ, Canton; William Francis Stockhausen, Northville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/412,083

(22) Filed: Oct. 4, 1999

(51) Int. Cl.[7] .................................................. F02D 1/00
(52) U.S. Cl. ............................................... 123/325; 60/285
(58) Field of Search ........................... 123/325, 326; 60/285

(56) References Cited

U.S. PATENT DOCUMENTS

| | | | |
|---|---|---|---|
| 5,119,781 | * | 6/1992 | Trombley et al. .................... 123/325 |
| 5,515,824 | * | 5/1996 | Yamagishi et al. .................. 123/325 |
| 5,558,051 | * | 9/1996 | Yoshioka .............................. 123/325 |
| 5,884,476 | * | 3/1999 | Hirota et al. ......................... 123/285 |
| 5,921,078 | * | 7/1999 | Takaku et al. ......................... 60/285 |

* cited by examiner

Primary Examiner—John Kwon
(74) Attorney, Agent, or Firm—Jerome R. Drouillard

(57) ABSTRACT

A reciprocating internal combustion engine using poppet valves, valve timing control and fuel injection, cuts off fuel during engine deceleration and controls valve timing such that charge is trapped in the engine cylinders while the fuel is shut off. As such, catalytic after treatment devices are neither cooled nor saturated with oxygen and engine fuel economy is improved.

6 Claims, 6 Drawing Sheets

INTERNAL COMBUSTION ENGINE HAVING DECELERATION FUEL SHUT OFF AND CAMSHAFT CONTROLLED CHARGE TRAPPING

BACKGROUND OF THE INVENTION

1. Technical Field

The present invention relates reciprocating internal combustion engines having individual cylinder fuel control and camshaft timing control.

2. Disclosure Information

In the interest of reducing fuel consumed by automotive engines, it is desirable to shut off fuel delivery when the engine is decelerating. This is termed deceleration fuel shut off (DFSO). A problem with such deceleration arises with respect to engines having exhaust aftertreatment systems, however. If fuel is shut off to an engine during deceleration, but the airflow through the engine continues unabated, the aftertreatment system will become loaded with oxygen and this will cause an excess amount of oxides of nitrogen (NOx) to be released once normal combustion is resumed. Unfortunately, even with the throttle in its closed or idle position, enough air will leak past and thereby cause the undesirable oxygen loading problem. And, although it is known to use port throttles and limited camshaft timing changes to control the gas flow through an engine during certain operating conditions, such a scheme will not work for the purpose of preventing the previously described NOx spike, because port throttling will allow some air to pass through the engine's cylinders, thereby loading the exhaust after treatment device with oxygen and causing the previously described increase in NOx when the engine is reactivated following a deceleration.

A system according to the present invention allows fuel to be shut off during engine deceleration without causing an increase in NOx during reactivation of the engine, because the engine's camshaft or valve timing is changed to the extent that regardless of the position of the engine's throttles, no net flow of mass, whether it be air, exhaust, or otherwise, will flow through the engine. In effect, charge is trapped in the engine and charge flow is halted.

SUMMARY OF THE INVENTION

A multicylinder internal combustion engine according to the present invention includes a crankshaft, a plurality of cylinders with each having a piston reciprocably mounted therein and connected to the crankshaft for reciprocation, and a plurality of intake and exhaust poppet valves for allowing intake air to enter the cylinders and for allowing combustion products to leave the cylinders. The intake and exhaust valves are powered by either a camshaft connected with a phaser which controls the timing of the camshaft, or by another type of valve actuation system which is capable of opening and closing the poppet valves according to a timing pattern established by a controller. The controller operates the intake and exhaust poppet valves either by means of the phaser or by another valve actuation device. The controller also operates fuel injectors which supply fuel to the cylinders.

When an engine equipped with a system according to the present invention decelerates in speed, the controller will reduce the flow of fuel to the cylinders and adjust the timing of the camshaft or other valve actuating system such that there is no net flow of charge through the cylinders and no fuel entering the cylinders. In the event that a dual equal camshaft timing system is used, such as with an engine having either a single camshaft for driving the intake and exhaust valves of a cylinder bank or separate camshafts which are driven according to the identical timing, the camshaft timing will be retarded such that the exhaust valves open after bottom dead center of the power stroke of the cylinder in which any particular exhaust valve is situated. Said another way, the opening and closing of the intake valves will occur approximately symmetrically about bottom dead center of the intake stroke and opening and closing of the exhaust valves will occur approximately symmetrically about top dead center of the exhaust stroke.

In the event that intake timing change only is used with a system according to the present invention, the intake poppet valve timing will be advanced such that the opening and closing of the intake valves occurs approximately symmetrically about top dead center at the conclusion of the exhaust stroke. In the event that exhaust only timing change is used according to the present invention, the timing of the exhaust poppet valves will be retarded such that opening and closing of the intake and exhaust valves occurs approximately concurrently and symmetrically about the midpoint of the intake stroke.

For the purposes of this specification, the engine is assumed to be a conventional four-stroke cycle reciprocating internal combustion engine.

According to another aspect of the present invention, a method for operating a poppet valve equipped, multicylinder internal combustion engine having a catalytic aftertreatment device, so as to avoid cooling and oxygen loading of the catalyst during deceleration fuel shut off, comprises the steps of: 1) sensing deceleration of the engine; 2) shutting off fuel supply to the cylinders of the engine; and 3) simultaneously with shutting off the fuel, adjusting the timing of the poppet valve opening and closing events such that no net flow of gases to and from the cylinders occurs.

It is an advantage of the present invention that an engine equipped with the present system will save fuel.

It is a further advantage of an engine according to the present invention that increased engine braking will be available with certain applications of this system.

It is yet another advantage of an engine according to the present invention that decreased engine-out exhaust emissions will be generated.

Other advantages as well as objects and features of the present invention will become apparent to the reader of this specification.

DETAILED DESCRIPTION OF PREFERRED EMBODIMENT(S)

Figure 1:
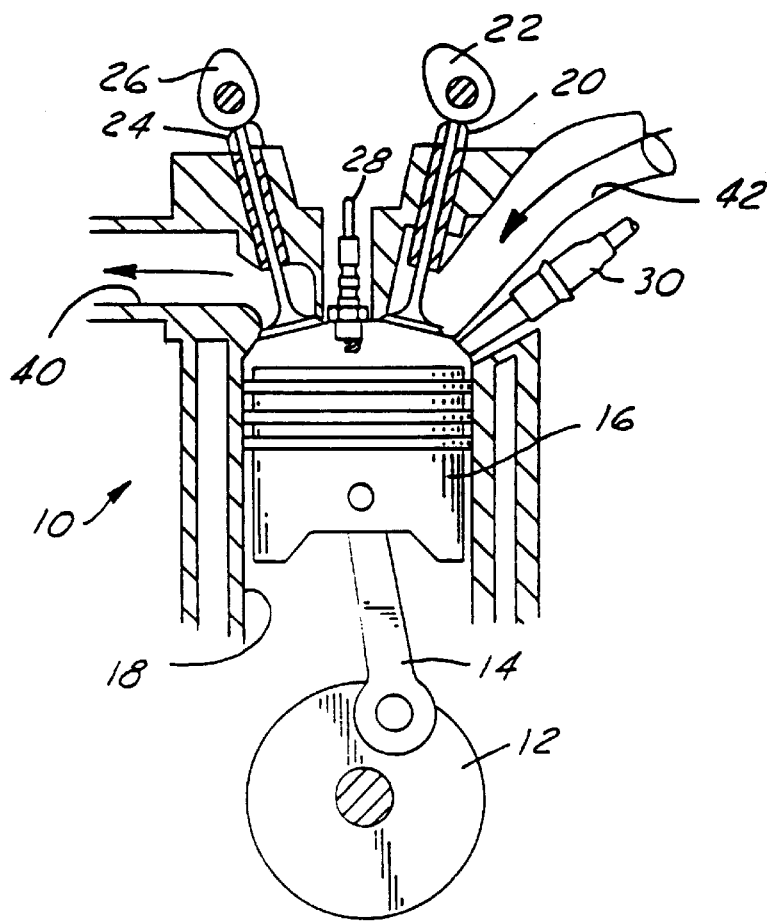
FIG. 1 is a schematic representation of an engine according to the present invention.

As shown in FIG. 1, engine 10, having crankshaft 12 with connecting rod 14 coupled thereto, further includes piston 16 which is reciprocably mounted within cylinder 18. Intake valve 20, which is powered by intake camshaft 22, allows air charge to enter engine 10. Exhaust valve 24, which is powered by exhaust camshaft 26, allows air charge or combustion gases to leave cylinder 18. Spark plug 28 ignites the mixture in engine 10 and fuel injector 30 provides fuel. Note that engine 10 is shown as being of the direct injection spark ignition variety, it being understood that a system according to the present invention could be used with port fuel injection interchangeably with direct injection.

Figure 2:
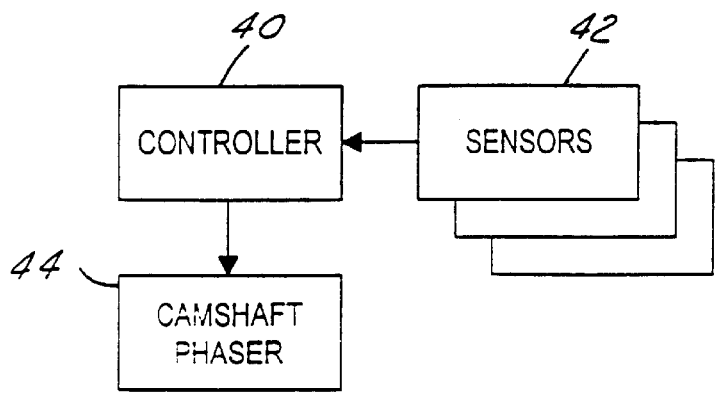
FIG. 2 is a block diagram showing the structure of an engine and control system according to the present invention

FIG. 2 illustrates controller 40 which receives inputs from a variety of sensors 42 such as manifold absolute pressure, charge temperature, mass airflow, throttle position, engine speed, engine load, spark timing, and other sensors known to those skilled in the art and suggested by this disclosure. Controller 40 operates camshaft phaser 44 which may be drawn from the class of camshaft phase controlling devices which are merely exemplified by U.S. Pat. No. 5,107,804, which is hereby incorporated by reference into this specification.

Those skilled in the art will appreciate in view of this disclosure that other types of valve actuation systems could be employed with an engine according to the present invention. For example, electrohydraulic or solenoid operated valves could be substituted for camshaft driven valves described in this specification.

Figure 3A:
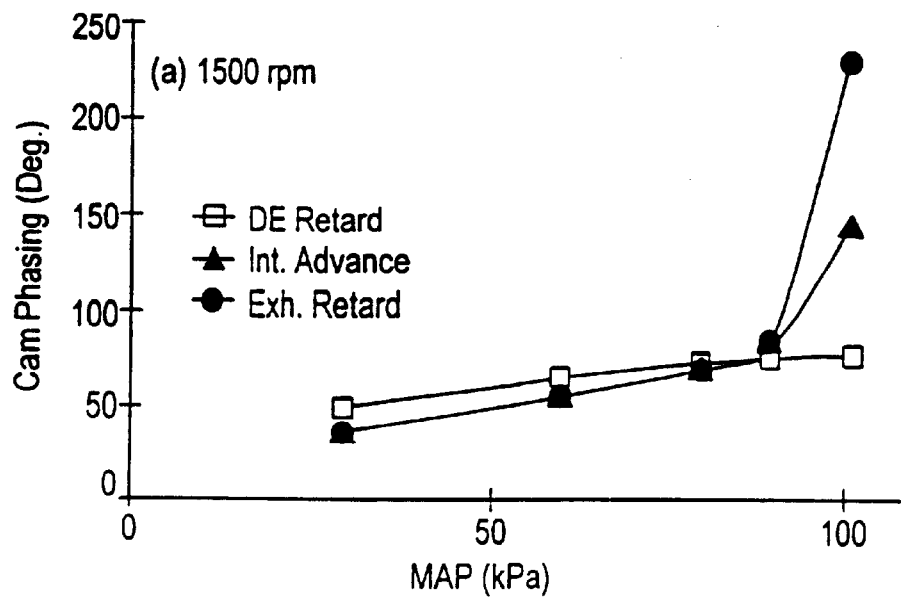
FIGS. 3a and 3b illustrate control plots according to one aspect of the present invention.
Figure 3B:
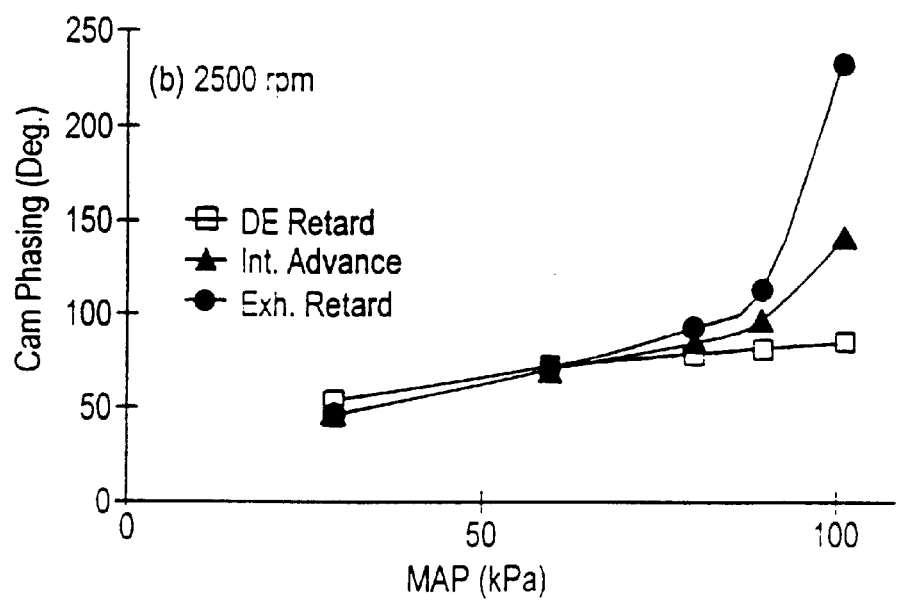

FIGS. 3A and 3B illustrate one important independent control variable of the system according to the present invention. Intake manifold absolute pressure (MAP) is used as a control variable for adjusting camshaft phasing or, in other words, valve timing. FIG. 3A relates to engine operation at 1500 rpm. If a dual equal (DE) camshaft retard system is used according to the present invention, the camshaft phasing will be progressively retarded as manifold pressure increases to 100 kPa. Note that in the case of either intake valve timing advance (Int. Advance), or exhaust valve timing retard (Exh. Retard), the relative amounts of camshaft timing change are greater than with the dual equal strategy at intake manifold pressures approaching atmospheric. Thus, for example, if approximately 80° of camshaft retard is needed for the dual equal strategy of FIG. 3A, almost 150° of intake valve timing advance is needed, and almost 230° of exhaust valve timing retard is needed to achieve the same result as with the dual equal (DE) strategy. This disparity is shown in FIG. 3B as well, which covers engine operation at 2500 rpm. As before, the exhaust retard and intake only advance strategies require much more phase shifting to accomplish the result of producing no net flow within the cylinder.

Those skilled in the art will appreciate that FIGS. 3A and 3B, although being dimensioned on both axes, are merely illustrative of a whole family of plots which may be employed with an engine according to the present invention.

Figure 4:
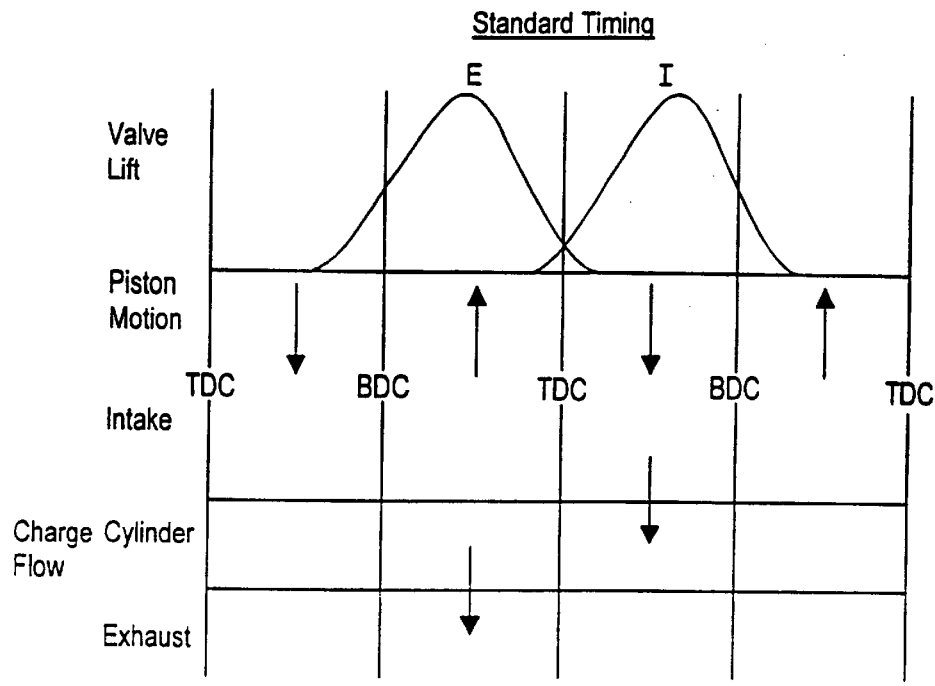
FIG. 4 illustrates conventional poppet valve timing.
Figure 5:
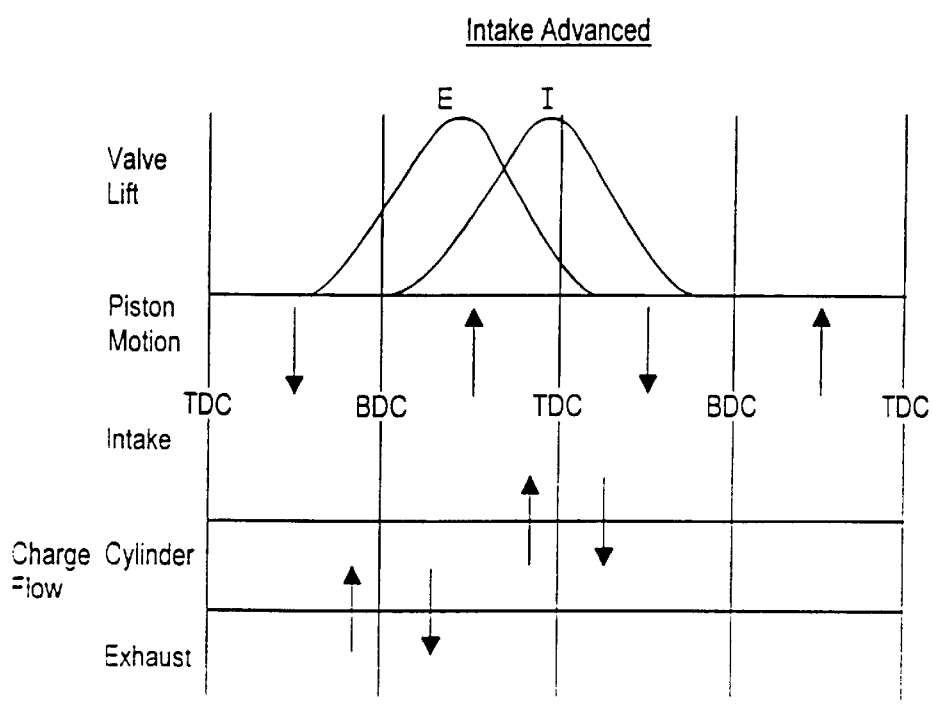
FIG. 5 illustrates an intake valve timing advance strategy according to the present invention.
Figure 6:
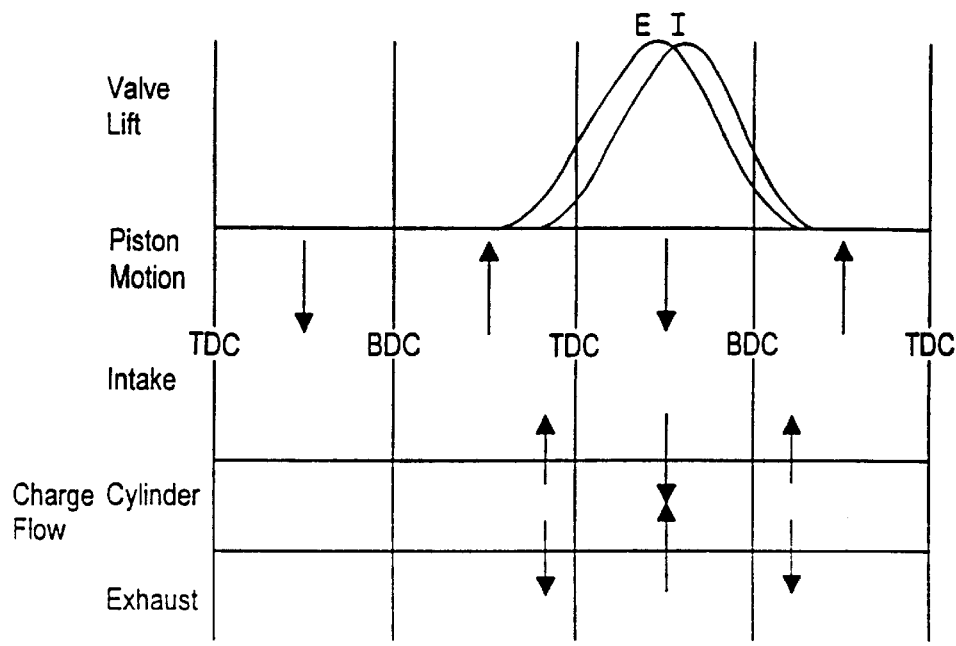
FIG. 6 illustrates an exhaust valve timing retard strategy according to the present invention.
Figure 7:
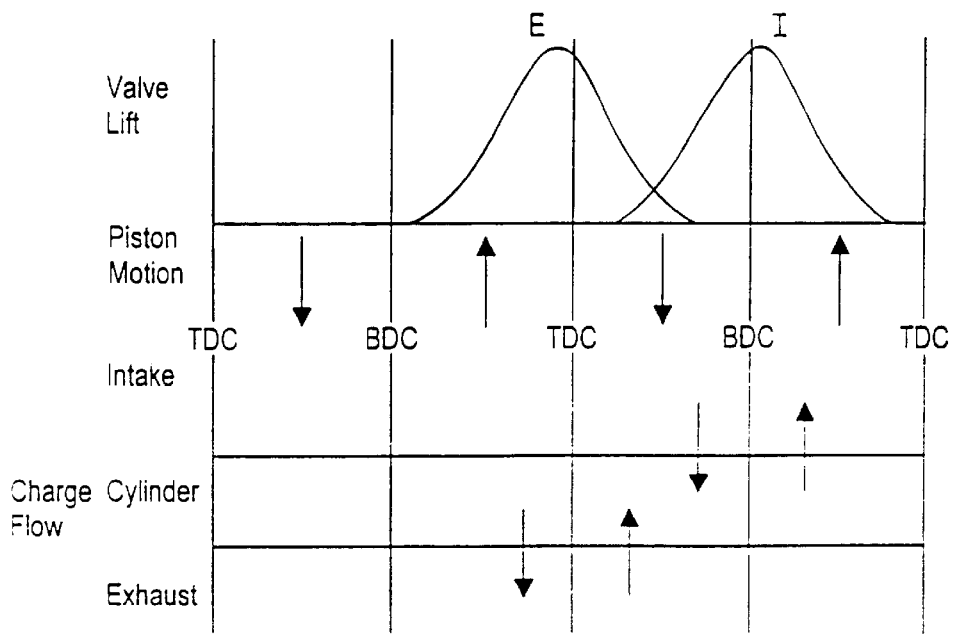
FIG. 7 illustrates a dual equal exhaust and intake timing retard strategy according to the present invention.

FIG. 4 illustrates standard valve timing and is a prototype figure for FIGS. 5, 6, and 7. The region labeled "valve lift" shows the exhaust (E) and intake (I) valve lift curves which are shown as a function of crankshaft position. Thus, in the middle of the plot of FIG. 4, the characters TDC (top dead center) and BDC (bottom dead center) are used for describing the position of the crankshaft and piston. The region labeled "piston motion" shows whether the piston is moving toward the cylinder head, in which case the arrow is in the upward position, or moving toward the crankshaft, in which case the arrow is in the lower position. The section of the plot labeled "charge flow" illustrates the direction of the net flow, whether it be from cylinder 18 past exhaust valve 24 or from intake of engine 10 past intake valve 20 and into cylinder 18.

FIG. 5 illustrate a first case according to the present invention in which the timing of intake camshaft 22 is advanced such that the opening and closing of intake valve 20 occurs approximately symmetrically about TDC at the conclusion of the exhaust stroke. At this advanced timing, valve overlap is dramatically increased during the exhaust stroke. Thus, charge is drawn from exhaust manifold 40 into cylinder 18 during the latter part of the power stroke; the charge returns to exhaust manifold 40 during the first part of the exhaust stroke. Charge also flows into intake manifold 42 during the latter part of the exhaust stroke and is drawn back into cylinder 18 during the first part of the intake stroke. As a result, there is no net flow of charge through the cylinders. Importantly, as noted above, this is accomplished without the use of a port throttle.

FIG. 6 illustrates a situation wherein no net flow of charge through the cylinders is achieved by retarding the timing of exhaust valve 24 such that opening of intake valve 20, and exhaust valve 24 occur approximately concurrently and symmetrically about the midpoint of the intake stroke. Thus, the exhaust valve timing is almost directly the same as the intake valve timing. As a result, at the beginning of the exhaust stroke, both valves are closed and the in-cylinder charge is compressed and subsequently expanded into both the intake and exhaust manifolds when valves 20 and 24 open. The charge is then drawn back into cylinder 18 during the intake stroke and pushed out of cylinder 18 during the start of the compression stroke. This results in no net flow charge through cylinder 18.

FIG. 7 illustrates a case of dual equal valve timing retard. This may be employed with a single camshaft or multiple camshafts, or yet other types of valve actuating devices. The important point is that both the intake and exhaust valves are subjected to the same timing retard. As a driver releases the accelerator pedal (not shown), engine 10 makes a transition into DFSO. The intake and exhaust event timings slew from a standard position (as shown in FIG. 4) to about 80 crankshaft degrees retarded for deceleration. This results in the exhaust valve open period being approximately symmetric about TDC of the exhaust stroke. Also, the intake valve open period is approximately symmetrical about BDC of the intake stroke. This causes the exhaust valve to open when the piston is ascending during the exhaust stroke and air is pushed from cylinder 18 into exhaust port and manifold 40. Exhaust valve 24 remains open during the beginning of the intake stroke and the same amount of air is drawn back from the exhaust port and manifold 40 into cylinder 18 due to downward motion of piston 16. Intake valve 20 opens later in the intake stroke as exhaust valve 24 is closing and draws air from the intake port and intake manifold 42 into cylinder 18. After BDC, intake valve 20 remains open and piston 16 pushes the same amount of air from cylinder 18 back into the intake port before intake valve 20 closes during the compression stroke. As before, no net charge flow occurs through the engine. Because no net charge flow occurs through an engine according to the present invention, catalyst cooling and oxygen loading of the aftertreatment system will be avoided, whereas at the same time, with no fuel entering the cylinders, fuel economy will be improved as will the capability for engine braking, particularly when exhaust timing retard is used.

Figure 8:
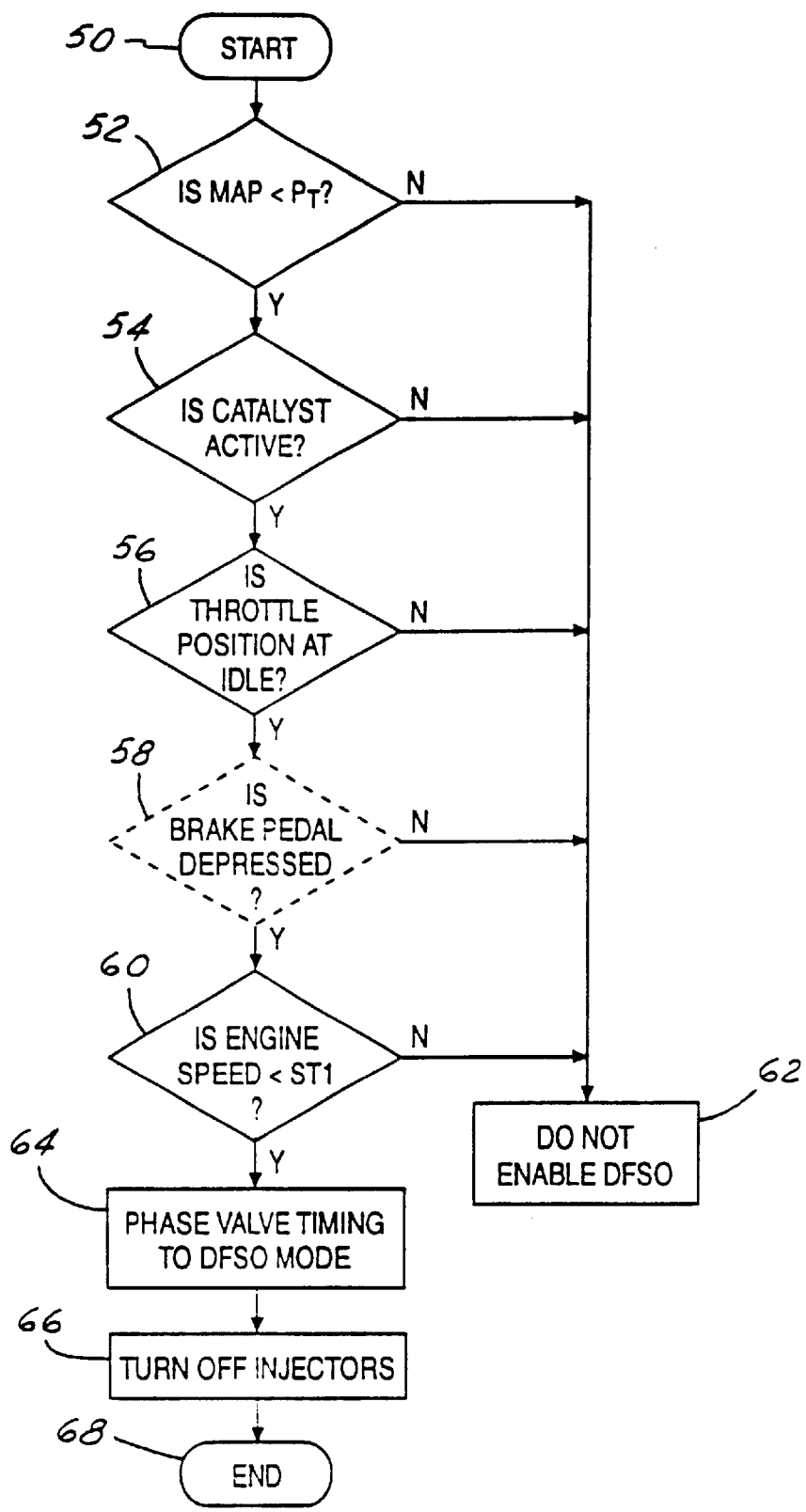
FIG. 8 is a flow chart illustrating steps in placing an engine into DFSO according to the present invention.

FIG. 8 illustrates a method of operating and engine to achieve the DFSO with charge trapping according to one aspect of the present invention. Beginning at block 50, controller 40 moves to block 52, wherein the intake manifold pressure (MAP) is compared with a threshold value, $P_T$. If MAP is greater than $P_T$, DFSO is not enabled, according to box 62.

If the answer at block 52 is yes, controller 40 moves to block 54, where an additional condition, namely catalyst activity, is the subject of an inquiry. Those skilled in the art will appreciate in view of this disclosure that that a myriad of systems and methods are available for detecting catalyst activity. These are, however, beyond the scope of the present invention. In any event, if the answer at block 54 is affirmative, controller 40 moves to block 56, where the throttle position is checked. If the throttle is in the idle position, optional block 58 may be next, with an inquiry being directed to the state of the brake pedal.

If block 58 is not used, controller 40 moves to block 60, where engine speed is compared with a threshold speed, $S_{T1}$. If the engine speed exceeds the threshold, the valve timing is moved or phased to DFSO mode, and fuel injectors 30 are turned off. In the event that the questions of blocks 54, 56, 58, or 60 are answered negatively, the DFSO will not be enabled.

Figure 9:
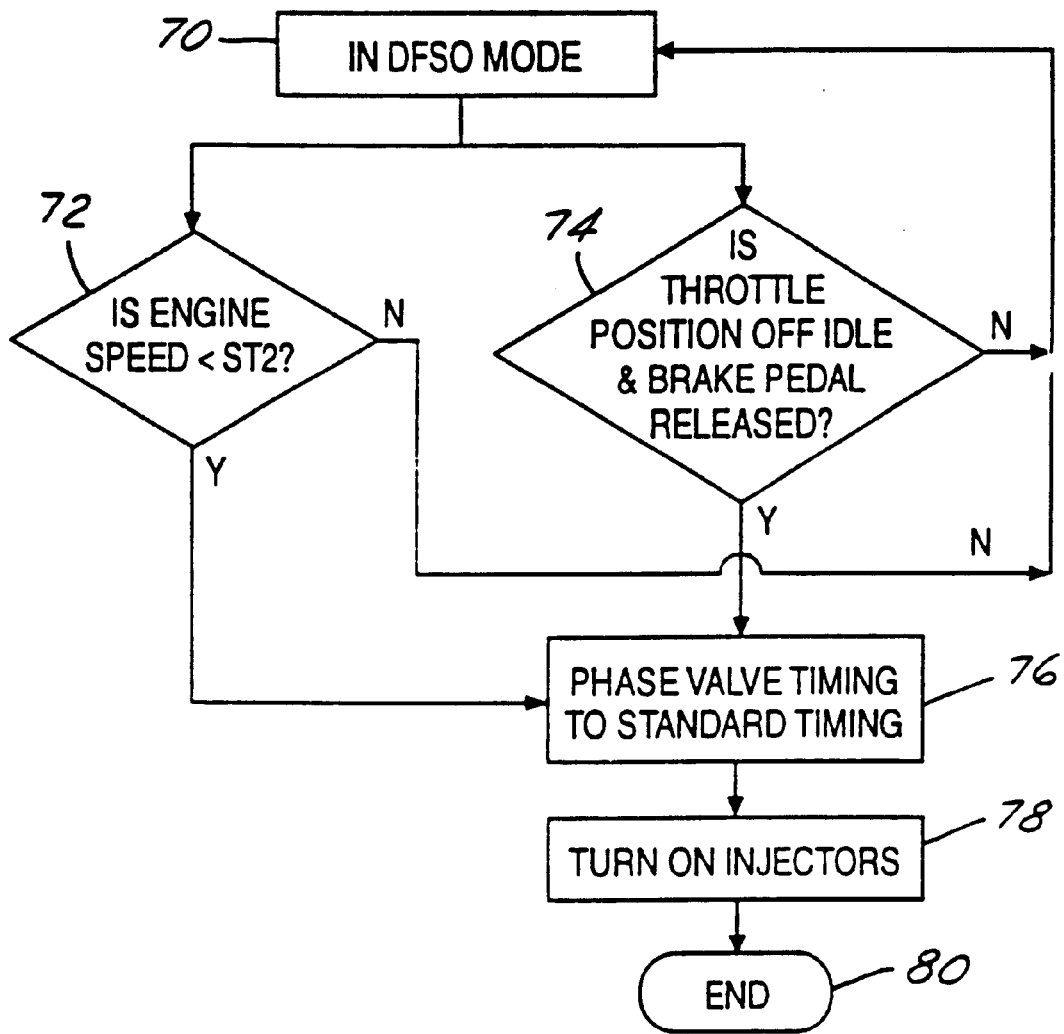
FIG. 9 is a flow chart illustrating steps for removing an engine from DMSO operation and resuming normal operation.

FIG. 9 illustrates the transition from DFSO to standard valve timing. Beginning from block 70, controller 40 moves to blocks 72 and 74. At block 72, the engine's speed is compared with a threshold value, $S_{T2}$. If the answer at block 72 is no, the engine stays in DFSO. The same is true at block 74 if the throttle is at idle and the brake pedal is not released. If however, the questions of either block 72 or block 74 are answered affirmatively, controller 40 will command phaser 44 to move to standard timing at block 76. Thereafter, injectors 30 will be turned on at block 78.

While the invention has been shown and described in its preferred embodiments, it will be clear to those skilled in the arts to which it pertains that many changes and modifications may be made thereto without departing from the scope of the invention.

What is claimed is:

1. A method for operating a poppet valve equipped, multicylinder internal combustion engine having a catalytic aftertreatment device, so as to trap charge in the cylinders during a DFSO operating mode, so as to avoid cooling and oxygen loading of the catalyst during DFSO, comprising the steps of:

sensing deceleration of the engine;

adjusting the timing of the poppet valve opening and closing events by retarding the timing of the intake and exhaust valves equally such that no net flow of gases to and from the cylinders occurs; and shutting off fuel supplied to the cylinders of the engine when a suitable air charge is no longer available within the cylinders.

2. A method according to claim 1, wherein said engine has direct injection of fuel into the cylinders of the engine.

3. A method according to claim 1, wherein deceleration of the engine is sensed by measuring throttle position and the air pressure within the engine's intake manifold.

4. A method according to claim 1, wherein the engine will be placed in DFSO only if an aftertreatment device associated with the engine is in an active state.

5. A method according to claim 1, wherein the engine will be placed in DFSO only if the speed of the engine is greater than a predetermined threshold.

6. A method according to claim 2, further comprising the steps of returning the engine to standard operation in the event that either the engine speed falls below a second predetermined threshold, or the throttle is opened beyond an idle position.

\* \* \* \* \*